United States Patent
Radhakrishnan et al.

(10) Patent No.: US 7,558,809 B2
(45) Date of Patent: Jul. 7, 2009

(54) TASK SPECIFIC AUDIO CLASSIFICATION FOR IDENTIFYING VIDEO HIGHLIGHTS

(75) Inventors: Regunathan Radhakrishnan, Woburn, MA (US); Michael Siracusa, Cambridge, MA (US); Ajay Divakaran, Woburn, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 591 days.

(21) Appl. No.: 11/326,818

(22) Filed: Jan. 6, 2006

(65) Prior Publication Data
US 2007/0162924 A1 Jul. 12, 2007

(51) Int. Cl.
*G06F 17/00* (2006.01)
(52) U.S. Cl. .................. 707/104.1; 707/101; 707/102; 725/18; 725/19
(58) Field of Classification Search ............. 707/101, 707/102, 104.1; 725/18, 19
See application file for complete search history.

(56) References Cited

U.S. PATENT DOCUMENTS

| | | | | |
|---|---|---|---|---|
| 2002/0093531 A1 * | 7/2002 | Barile | | 345/753 |
| 2004/0002930 A1 * | 1/2004 | Oliver et al. | | 706/46 |
| 2004/0167767 A1 * | 8/2004 | Xiong et al. | | 704/1 |
| 2005/0154973 A1 * | 7/2005 | Otsuka et al. | | 715/501.1 |

OTHER PUBLICATIONS

Xiong et al. ("Effective and Efficient Sports Highlights Extraction Using The Minimum Description Length Criterion in Selecting GMM Structures", IEEE 2004, pp. 1947-1950).*
U.S. Appl. No. 10/922,781, filed Aug. 20, 2004, Radhakrishnan et al.
Ziyou Xiong, Regunathan Radhakrishnan, Ajay Divakaran and Thomas S. Huang, "Effective and Efficient Sports Highlights Extraction Using the Mininum Description Length Criterion in Selecting GMM Structures," Intl. Conf. on Multimedia and Expo, Jun. 2004.
Kohavi, R., "A Study of Cross-Validation and Bootstrap for Accuracy Estimation and Model Selection," Proceedings of the 14th International Joint Conference on Artificial Intelligence, Stanford University, 1995.

* cited by examiner

*Primary Examiner*—Christian P. Chace
*Assistant Examiner*—Son T Hoang
(74) *Attorney, Agent, or Firm*—Dirk Brinkman; Gene Vinokur

(57) ABSTRACT

A method classifies segments of a video using an audio signal of the video and a set of classes. Selected classes of the set are combined as a subset of important classes, the subset of important classes being important for a specific highlighting task, the remaining classes of the set are combined as a subset of other classes. The subset of important classes and classes are trained with training audio data to form a task specific classifier. Then, the audio signal can be classified using the task specific classifier as either important or other to identify highlights in the video corresponding to the specific highlighting task. The classified audio signal can be used to segment and summarize the video.

11 Claims, 8 Drawing Sheets

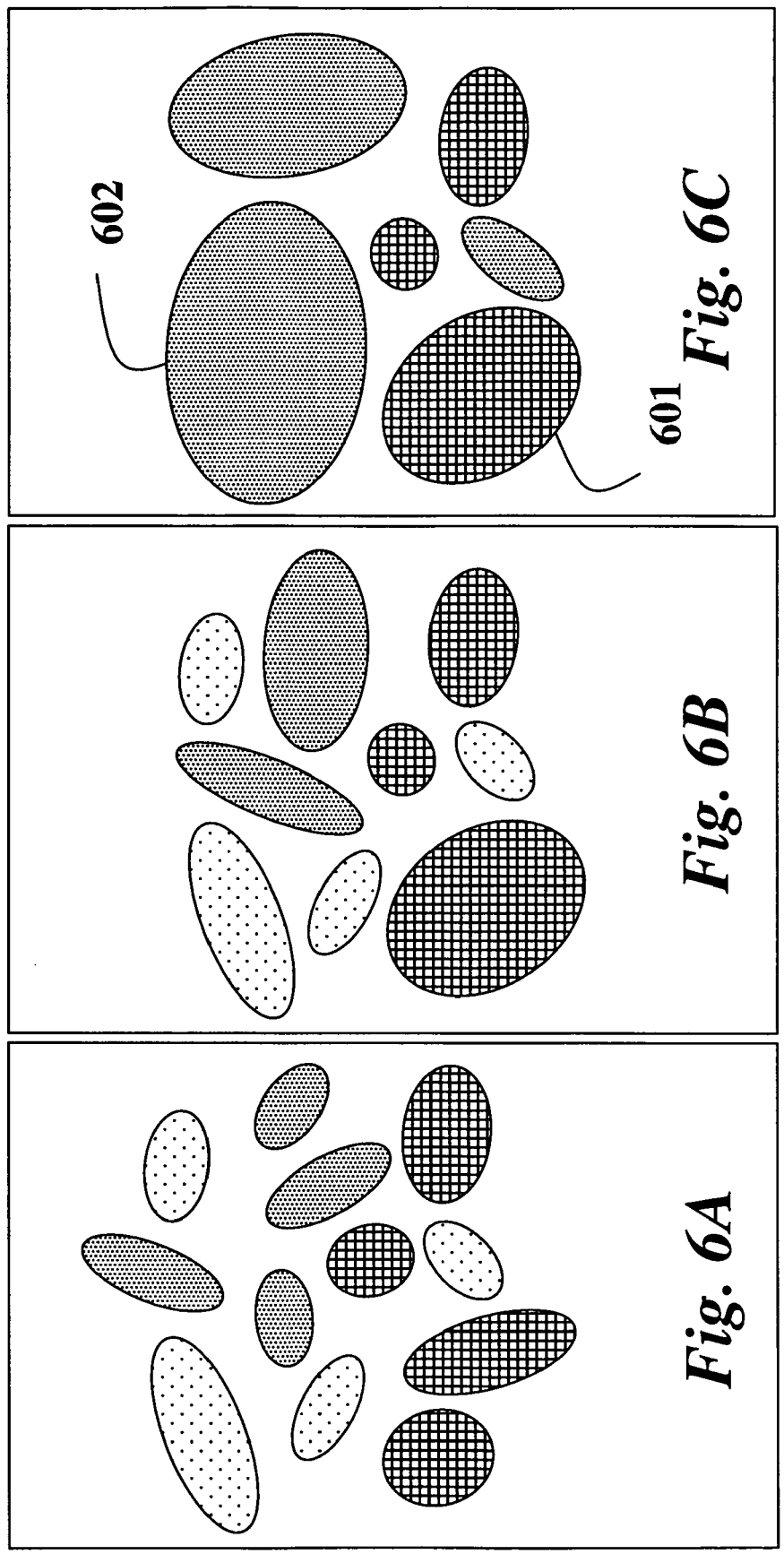

| Classes | Components |
|---|---|
| *important* | 14 |
| other | 28 |

*Fig. 7B*

| Classes | Components |
|---|---|
| *applause* | 7 |
| cheering | 18 |
| music | 11 |
| speech | 28 |
| excited speech | 14 |

*Fig. 7A*

TASK SPECIFIC AUDIO CLASSIFICATION FOR IDENTIFYING VIDEO HIGHLIGHTS

FIELD OF THE INVENTION

This invention relates generally to classifying video segments, and more particularly to classifying video segments according to audio signals.

BACKGROUND OF THE INVENTION

Segmenting scripted or unscripted video content is a key task in video retrieval and browsing applications. A video can be segmented by identifying highlights. A highlight is any portion of the video that contains a key or remarkable event. Because the highlights capture the essence of the video, highlight segments can provide a good summary of the video. For example, in a video of a sporting event, a summary would include scoring events and exciting plays.

FIG. 1 shows one typical prior art audio classification method 100, see Ziyou Xiong, Regunathan Radhakrishnan, Ajay Divakaran and Thomas S. Huang, "Effective and Efficient Sports Highlights Extraction Using the Minimum Description Length Criterion in Selecting GMM Structures," Intl. Conf. on Multimedia and Expo, June 2004; and U.S. patent application Ser. No. 10/922,781 "Feature Identification of Events in Multimedia," filed on Aug. 20, 2004 by Radhakrishnan et al., both incorporated herein by reference.

An audio signal 101 is the input. Features 111 are extracted 110 from frames 102 of the audio signal 101. The features 111 can be in the form of modified discrete cosine transforms (MDCTs).

As also shown in FIG. 2, the features 111 are classified as labels 121 by a generic multi-way classifier 200. The generic multi-way classifier 200 has a general set of trained audio classes 210, e.g., applause, cheering, music, normal speech, and excited speech. Each audio class is modeled by a Gaussian mixture model (GMM). The parameters of the GMMs are determined from features extracted from training data 211.

The GMMs of the features 111 of the frames 102 are classified by determining a likelihood that the GMM of the features 111 corresponds to the GMM for each class, and comparing 220 the likelihoods. The class with the maximum likelihood is selected as the label 121 of a frame of features.

In the generic classifier 200, each class is trained separately. The number m of Gaussian mixture components of each model is based on minimum description length (MDL) criteria. The MDL criteria are commonly used when training generative models. The MDL criteria for input training data 211 can have a form:

$$MDL(m) = -\log p(\text{data}|\Theta,m) - \log p(\Theta|m), \quad (1)$$

where m indexes mixture components of a particular model with parameters $\Theta$, and p is the likelihood or probability.

The first term of Equation (1) is the log likelihood of the training data under a m mixture component model. This can also be considered as an average code length of the data with respect to the m mixture model. The second term can be interpreted as an average code length for the model parameters $\Theta$. Using these two terms, the MDL criteria balance identifying a particular model that most likely describes the training data with the number of parameters required to describe that model.

A search is made over a range of values for k, e.g., a range between 1 and 40. For each value k, a value $\Theta^k$ is determined using an expectation maximization (EM) optimization process that maximizes the data likelihood term and the MDL score is calculated accordingly. The value k with the minimum expectation score is selected. Using the MDL to train the GMMs of the classes 210 comes with an implicit assumption that selecting a good generative GMM for each audio class separately yields better general classification performance.

The determination 130 of the importance levels 131 is dependent on a task 140 or application. For example, the importance levels correspond to a percentage of frames that are labeled as important for a particular summarization task. In a sports highlighting task, the important classes can be excited speech or cheering. In a concert highlighting task, the important class can be music. By setting thresholds on the importance levels, different segmentations and summarizations can be obtained for the video content.

By selecting an appropriate set of classes 210 and a comparable generic multi-way classifier 200, only the determination 130 of the importance levels 131 needs to dependent on the task 140. Thus, different tasks can be associated with the classifier. This simplifies the implementation to work with a single classifier.

SUMMARY OF THE INVENTION

The embodiments of the invention provide a method for classifying an audio signal of an unscripted video as labels. The labels can then be used to detect highlights in the video, and to construct a summary video of just the highlight segments.

The classifier uses Gaussian mixture models (GMMs) to detect audio frames representing important audio classes. The highlights are extracted based on the number of occurrences of a single or mixture of audio classes, depending on a specific task.

For example, a highlighting task for a video of a sporting event depends on a presence of excited speech of the commentator and the cheering of the audience, whereas extracting concert highlights would depend on the presence of music.

Instead of using a single generic audio classifier for all tasks, the embodiments of the invention use a task dependent audio classifier. In addition, a number of mixture components used for the GMMs in our task dependent classifier is determined using a cross-validation (CV) error during training, rather than minimum description length (MDL) criteria as in the prior art.

This improves the accuracy of the classifier, and reduces the time required to perform the classification.

BRIEF DESCRIPTION OF THE DRAWINGS

FIGS. 6A-6C compare models of various classifiers;

FIGS. 7A and 7B compare mixture components of generic and task specific classifiers.

DETAILED DESCRIPTION OF THE PREFERRED EMBODIMENT

Figure 3:
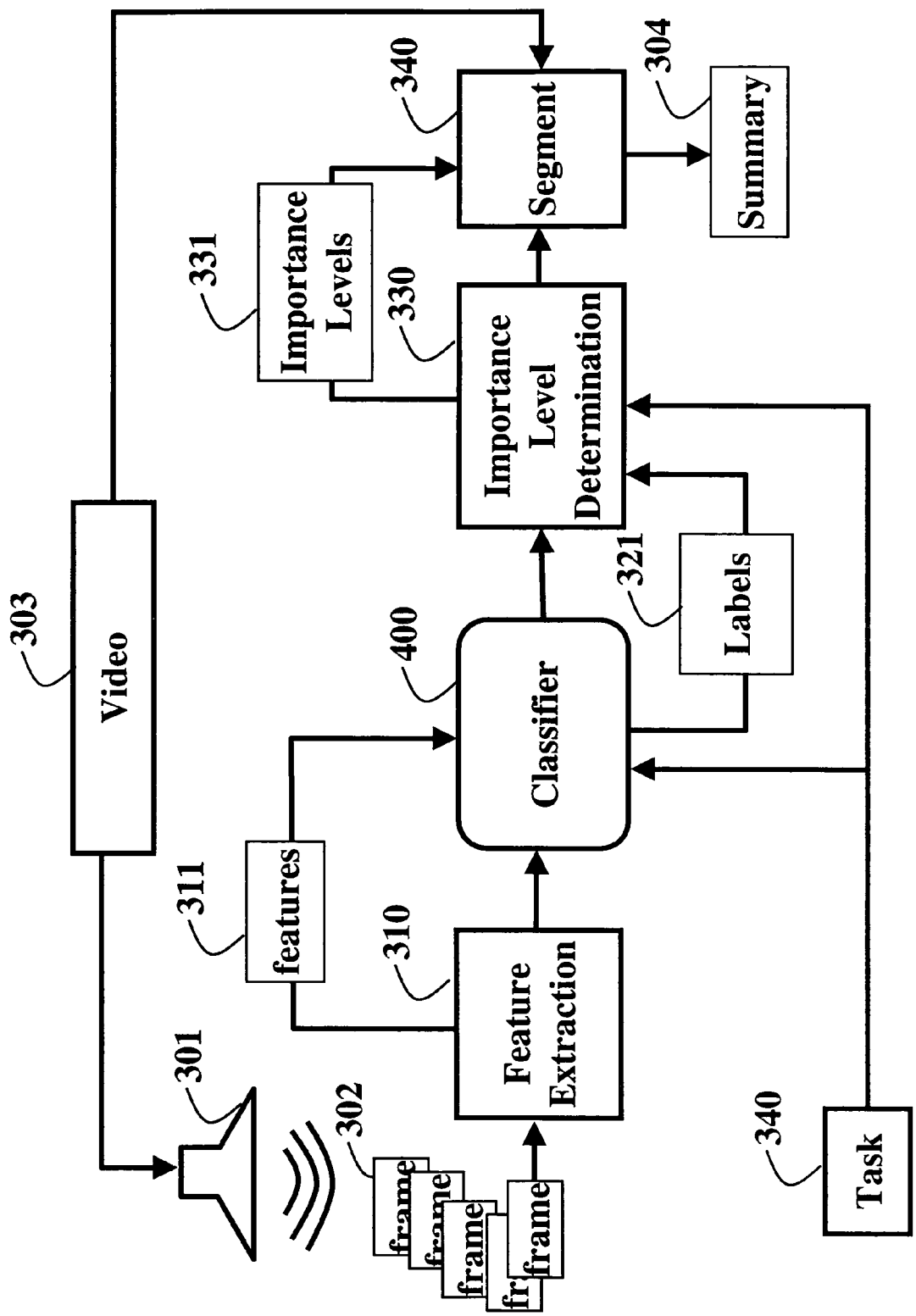
FIG. 3 is a block diagram of a classification method according to an embodiment of the invention.

FIG. 3 shows a method for classifying 400 an audio signal 301 of a video 303 as labels 321 for a specific task 340 according to an embodiment of the invention. The labels 321 can then be used to identify highlights in the video. The highlights can be segmented 340 to generate a summary 304 of the video that only includes highlights.

The audio signal 301 of the video 303 is the input. Features 311 are extracted 310 from frames 302 of the audio signal 301. The features 311 can be in the form of modified discrete cosine transforms (MDCTs). It should be noted that other audio features can also be classified, e.g., Mel frequency cepstral coefficients, discrete Fourier transforms, etc.

Figure 4:
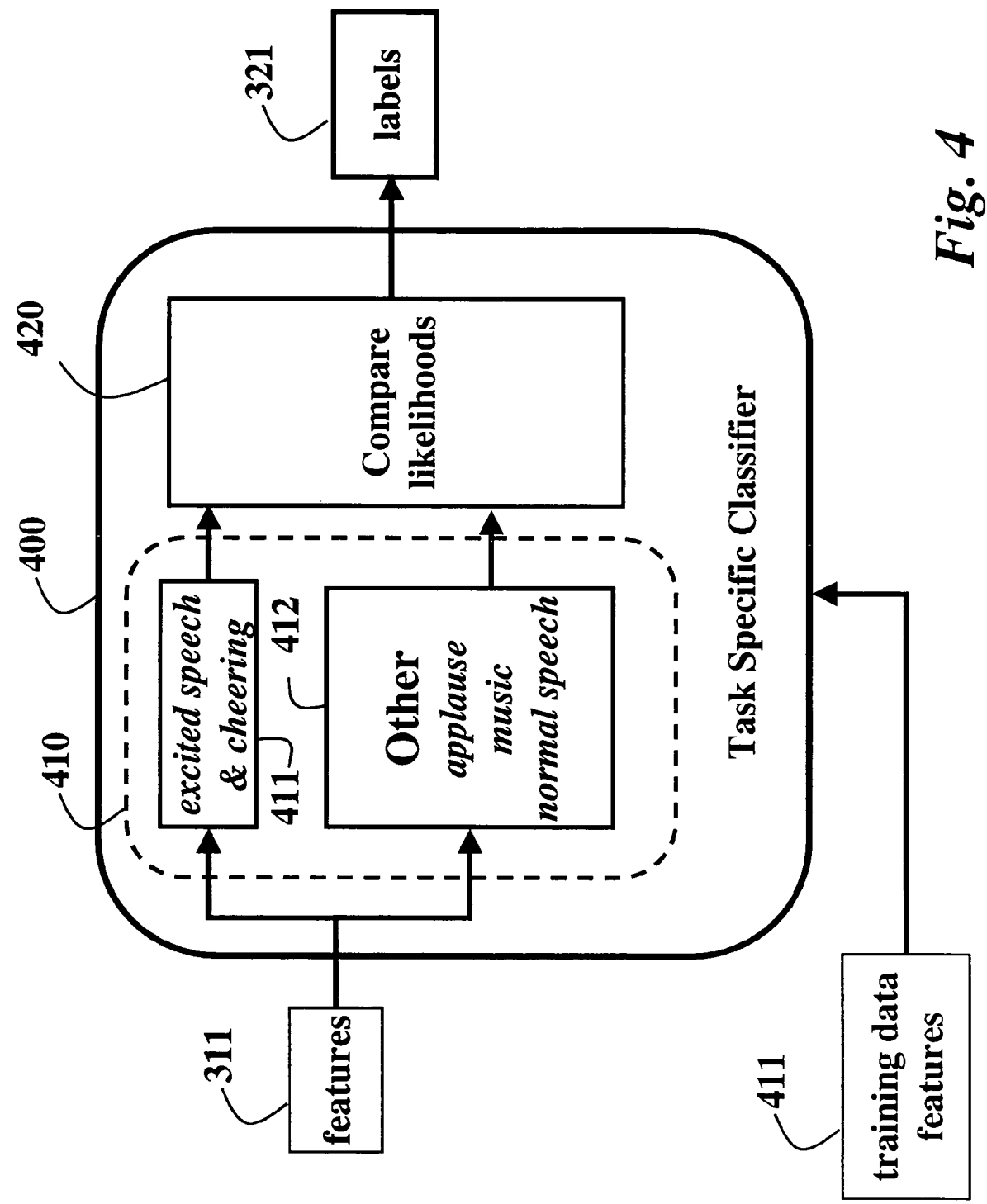
FIG. 4 is a block diagram of a task specific binary classifier.

As also shown in FIG. 4, the features 311 are classified by assigning labels 321 by a task specific, binary classifier 400. The GMMs of the features 311 of the frames 302 are classified by determining a likelihood that the GMM of the features 311 corresponds to the GMM for each class, and comparing 320 the likelihoods. The class with the maximum likelihood is selected as the label 321 of a frame of features.

The task specific classifier 400 includes a set of trained classes 410. The classes can be stored in a memory of the classifier. A subset of the classes that are considered important for identifying highlights are combined as a subset of important classes 411. The remaining classes are combined as a subset of other classes 412. The subset of important classes and the subset of other classes are jointly trained with training data as described below.

For example, the subset of important classes 411 includes the mixture of excited speech of the commentator and cheering of the audience. By excited speech of the commentator, we mean the distinctive type of loud, high-pitched speech that is typically used by sport announcers and commentators when goals are scored in a sporting event. The cheering is usually in the form of a lot of noise. The subset of other classes 412 includes the applause, music, and normal speech classes. It should be understood, that the subset of important classes can be a combination of multiple classes, e.g., excited speech and spontaneous cheering and applause.

In any case, for the purposes of training and classifying there are only two subsets of classes: important and other. The task specific classifier can be characterized as a binary classifier, even though each of the subsets can include multiple classes. As an advantage, a binary classifier is usually more accurate than a multi-way classifier, and takes less time to classify.

The determination 330 of the importance levels 331 is also dependent on the specific task 340 or application. For example, the importance levels correspond to a percentage of frames that are labeled as important for a particular summarization task. For a sports highlighting task, the subset of important classes includes a mixture of excited speech and cheering classes. For a concert highlighting task, the important classes would at least include the music class, and perhaps applause.

Figure 5:
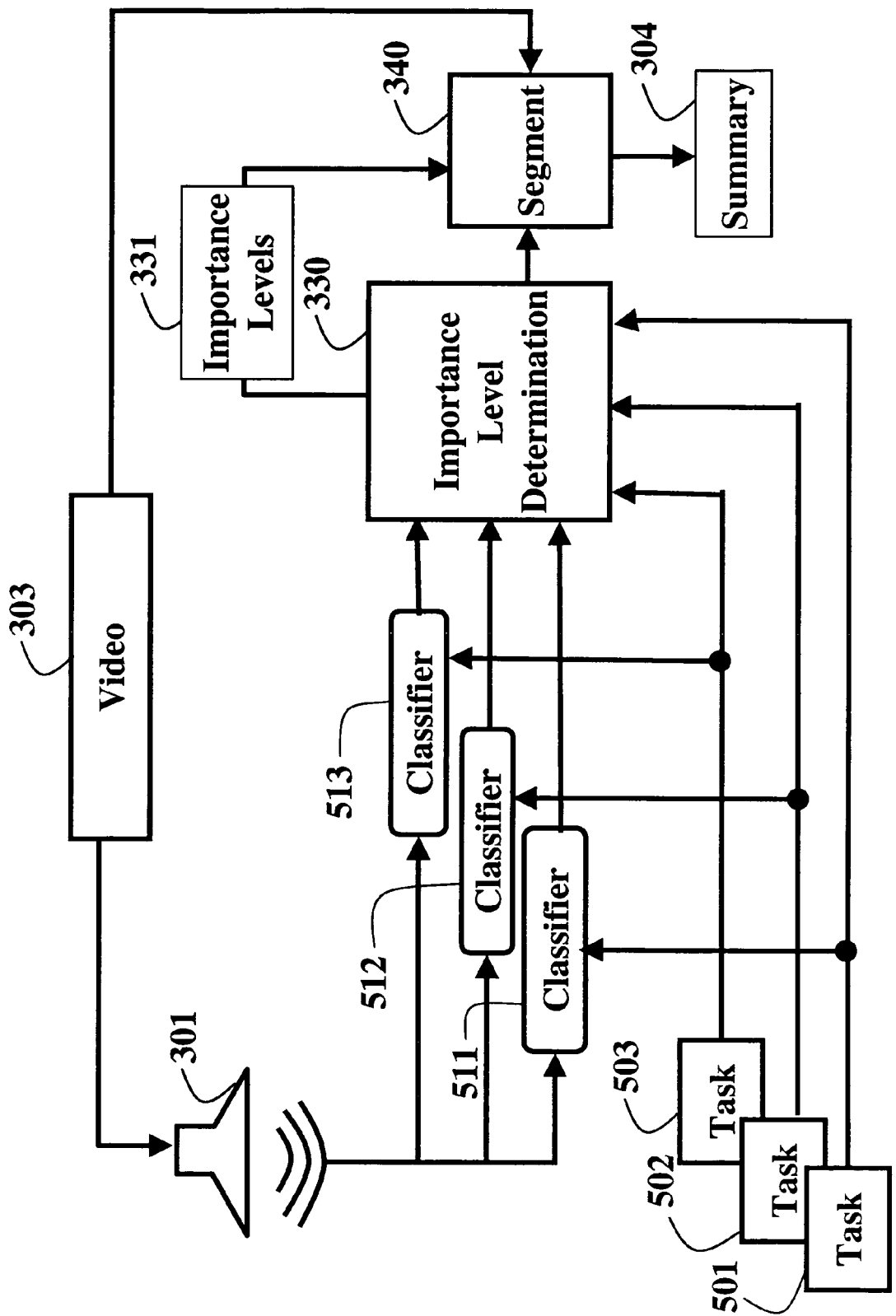
FIG. 5 is a block diagram of multiple task specific classifiers for corresponding tasks.

FIG. 5 shows the general concept for the binary audio classifiers according to the embodiments of the invention. Each one of specific tasks 501-503 is associated with a corresponding one of the task specific classifiers 511-513. The main difference with the prior art is that instead of a generic, multi-way audio classifier, we now insert a classifier depending on a specific task. This allows users to construct small and efficient classifiers optimized for different types of highlights in a video.

As shown in FIG. 4 for the particular type of highlighting task 340, we use one Gaussian mixture model (GMM) for the subset of important classes, and one GMM for the subset of other classes. The subset of important classes is trained using training examples data for the important classes. The subset of other classes is trained using training examples data from all of the other classes.

FIG. 4 shows the task specific binary classifier 400 designed for sports highlights. This classifier uses a binary classifier where the important classes include a mixture of excited speech and cheering, and the subset of other classes models all other audio components.

The motivation for constructing the task specific classifier 400 is that we can then reduce the computational complexity of the classification problem, and increase the accuracy of detecting of the important classes.

Although there can be multiple classes, by combining the classes into two subsets, we effectively achieve a binary classifier. The binary classification requires fewer computations than a generic multi-way classifier that has to distinguish between a larger set of generic audio classes.

Figure 1:
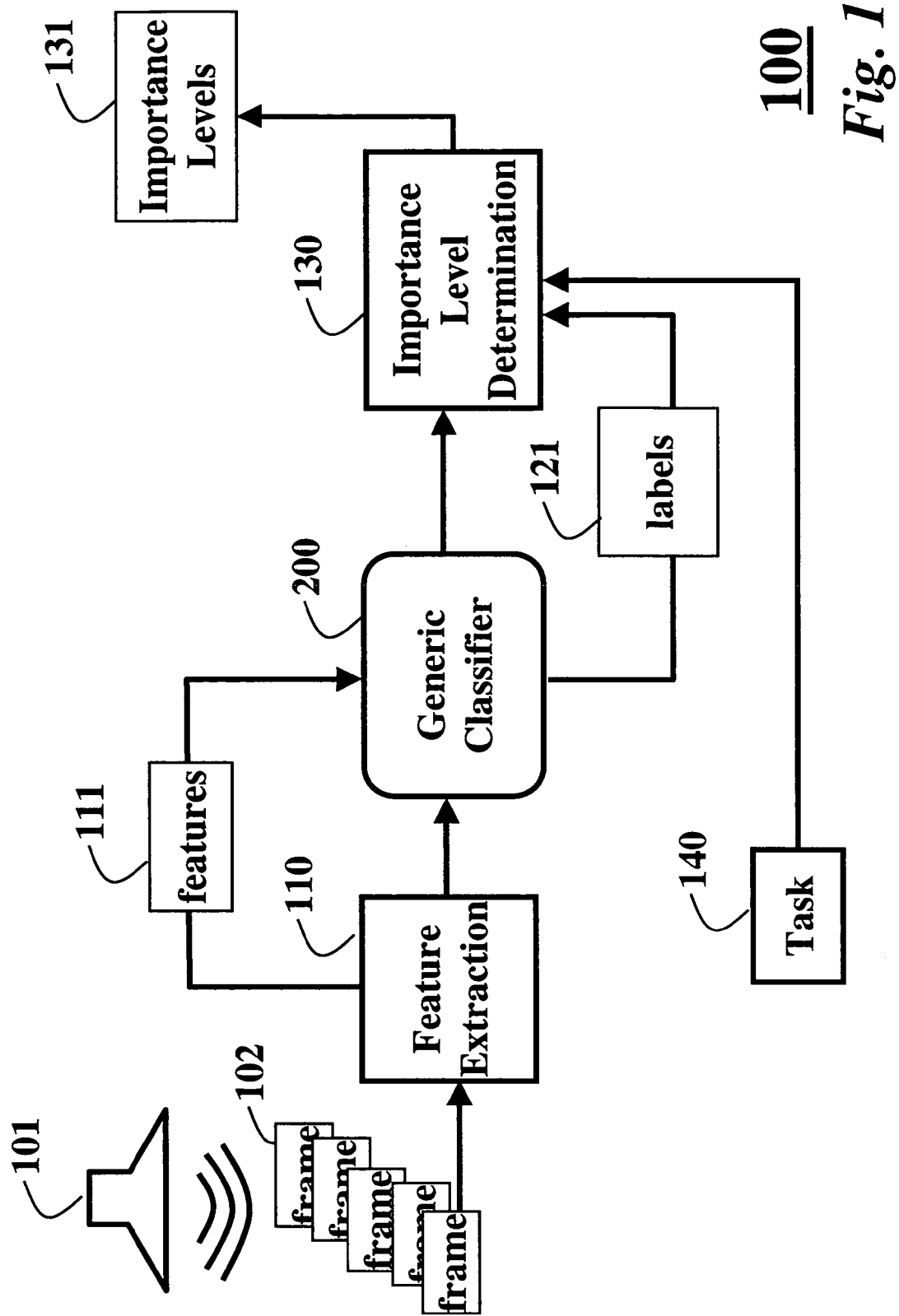
FIG. 1 is a block diagram of a prior art classification method.
Figure 2:
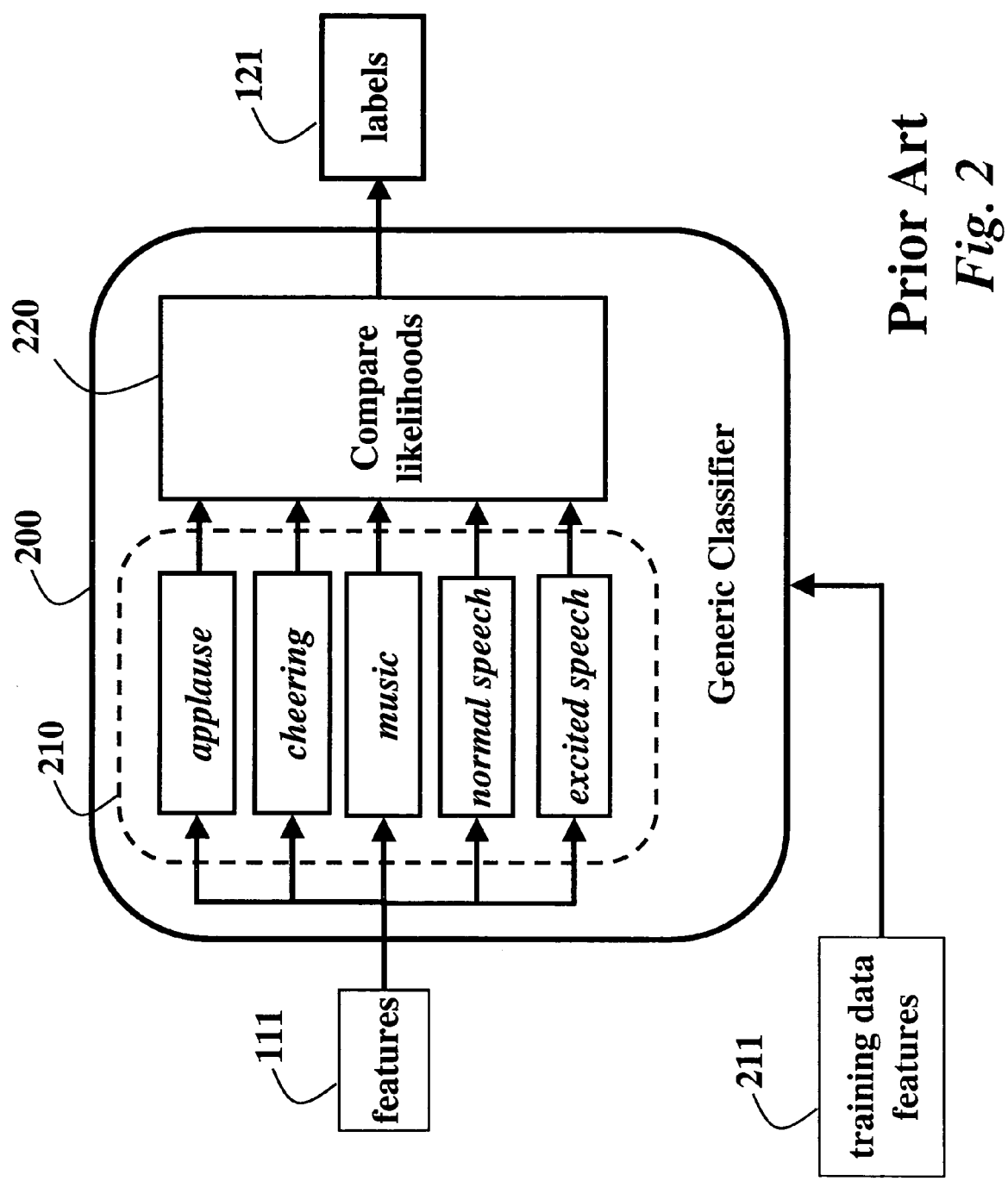
FIG. 2 is a block diagram of a prior art generic multi-way classifier.

However, we also consider how this classifier is trained, keeping in mind that the classifier uses subsets of classes. If we were to follow the same MDL based training procedure of the prior art, then we would most likely learn the same mixture components for the various classes. That is, when training the subset of other classes for the task specific classifier using MDL, it is likely that the number of mixture components learned will be very close to the sum of the number of components used for the applause, speech, and music classes shown in FIG. 2. This is because the MDL training procedure is concerned with producing a good generative GMM from the training data 211.

If redundancy among the subset of other classes is small, then the trained model is simply a combination of the models for all the classes the model represents. The MDL criteria are used to help find good generative models for the training data 211, but do not directly optimize what we are ultimately concerned with, namely classification performance.

We would like to select the number and parameters of mixture components for each GMM that, when used for classification, have a lowest classification error. Therefore, for our task specific classifiers, we use a joint training procedure that optimizes an estimate of classification rather than the MDL.

Let C=2, where C is the number of subsets of classes in our classifier.

We have $N_{train}$ samples in a vector x of training data 411. Each sample $x_i$ has an associated class label $y_i$, which takes on values 1 to C. Our classifier 400 has a form:

$$f(x; m) = \underset{y}{\operatorname{argmax}}\, p(x \mid y, m_y, \Theta_y), \quad (2)$$

where $m = [m_1, \ldots, m_C]^T$ is the number of mixture components for each class model and $\Theta_i$ is the parameters associated with class i, i={1, 2}. This is contrasted with the prior art generic classifier 200 expressed by equation (1).

If we have sufficient training data 411, then we set some of the training data aside, as a validation set with $N_{test}$ samples, and their associated labels $(x_i, y_i)$. An empirical test error on this set for a particular m is $$TestErr(m) = \frac{1}{N_{test}} \sum_{i=1}^{N_{test}} 1 - \delta(y_i - f(x_i; m)), \quad (3)$$

where $\delta$ is 1 when $y_i = f(x_i; m)$, and 0 otherwise.

Using this criteria, we pick the $\hat{m}$ with:

$$\hat{m} = \underset{m}{\operatorname{argmin}} TestErr(m). \quad (4)$$

This requires a grid search over a range of settings for m, and for each setting, retraining the GMMs, and examining the test error of the resulting classifier.

If the training data are insufficient to set aside the validation set, then a K-fold cross validation can be used, see Kohavi, R., "A Study of Cross-Validation and Bootstrap for Accuracy Estimation and Model Selection," Proceedings of the 14th International Joint Conference on Artifical Intelligence, Stanford University, 1995, incorporated herein by reference.

K-fold cross-validation is summarized as follows. The training data are partitioned into K equally sized parts. Let $$\kappa: \{1, \ldots, N\} \to \{1, \ldots, K\}$$

map N training samples to one of these K parts. Let $f^k(x; m)$ be the classifier trained on the set of training data with the $k^{th}$ part removed. Then, the cross validation estimate of error is:

$$CV(m) = \frac{1}{N} \sum_{i=1}^{N} 1 - \delta(y_i - f^{\kappa(i)}(x_i; m)). \quad (5)$$

That is, for the $k^{th}$ part, we fit the model to the other K−1 parts of the data, and determine the prediction error of the fitted model when predicting the $k^{th}$ part of the data. We do this for each part of the K parts of training data. Then, we determine $$\hat{m} = \underset{m}{\operatorname{argmin}} CV(m). \quad (6)$$

This requires a search over a range of m. We can speed up training by searching over a smaller range for m. For example, in the classifier shown in FIG. 4, we could fix $m_1$ as for the important classes 411, and only search over $m_2$ for the subset of other classes 412. We can select $m_1$ using the MDL criteria, i.e., keeping the GMM for the subset of important classes.

FIGS. 6A-6C show symbolically how different training procedures can result in different models. FIG. 6A shows GMM models learned using the prior art MDL procedure for three different classes in a 2D feature space. The MDL criteria pick the number of mixture components for each class separately. The MDL criteria are good for model selection where each generative probabilistic model is trained separately without the knowledge of other classes. With the MDL, all clusters within a class are treated as equally important.

FIG. 6B shows an expected result of using cross-validation (CV), rather than MDL for training. We see that CV picks fewer components for each class. Specifically, CV summarizes the fine details of the models of FIG. 6A by using fewer components. However, we see that even though some fine detail is lost about each class, we can still distinguish between the classes.

FIG. 6C shows what would happen when we segregate the classes into a subset of important classes and all other classes, and effectively construct a binary classifier. We can see that we can use fewer mixture components and still distinguish between the important classes 601 and the other classes 602.

Cross-validation for model selection is good for discriminative binary classifiers. For instance, while training a model for the subset of important classes, we also pay attention to the others class, and vice versa. Because the joint training is sensitive to the competing classes, the model is more careful in modeling the clusters in the boundary regions than in other regions. This also results in a reduction of model complexity.

Effect of the Invention

Embodiments of the invention provide highlight detection in videos using task specific binary classifiers. These task specific binary classifiers are designed to distinguish between fewer classes, i.e., two subsets of classes. This simplification, along with training based on cross-validation and test error can result in the use of fewer mixture components for the class models. Fewer mixture components means faster and more accurate processing.

FIG. 7A shows the number of components (72) for the prior art general classes, and FIG. 7B shows the number of components (42) for the task specific classes.

Figure 8:
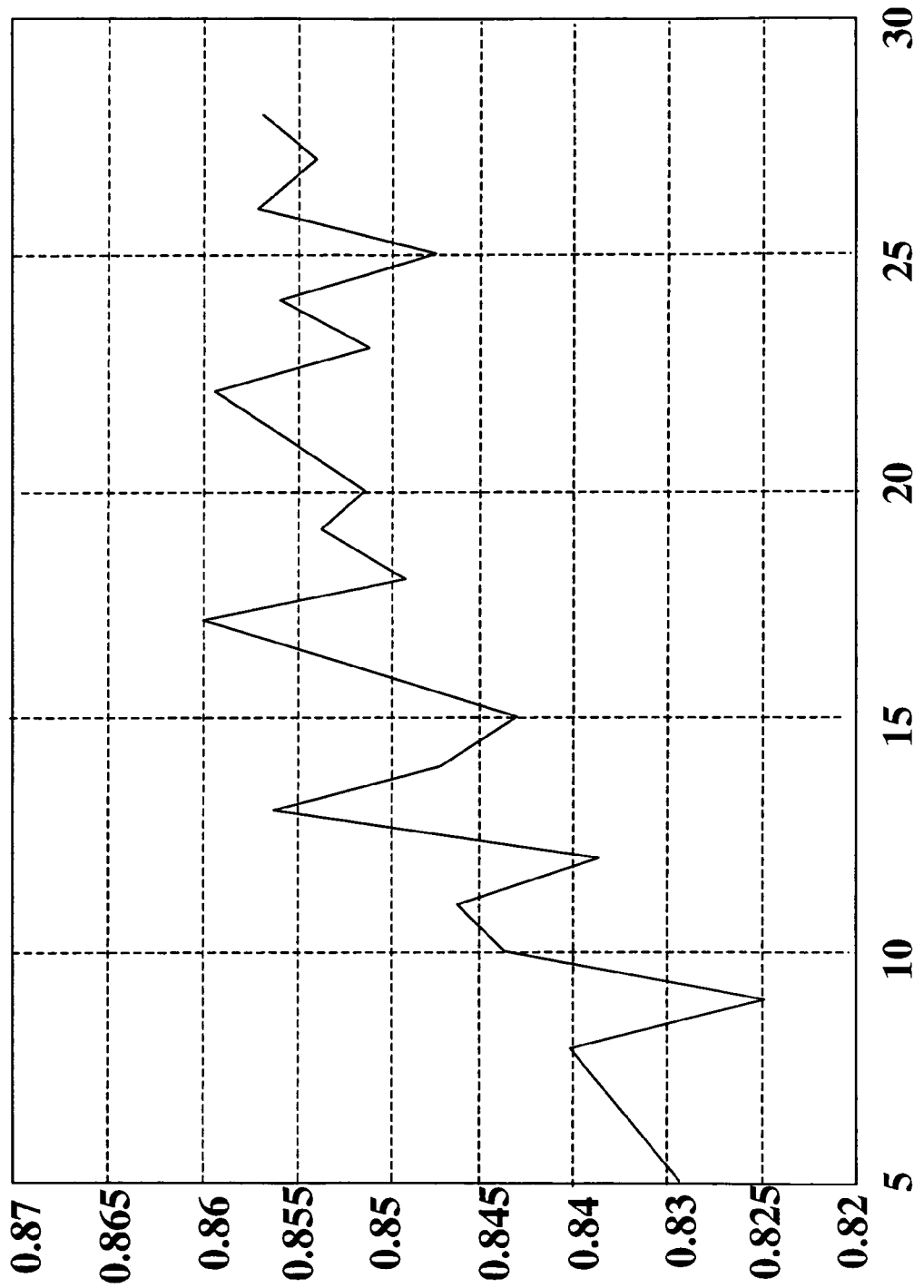
FIG. 8 is a graph of classification accuracy for the classifier according to an embodiment of the invention.

FIG. 8 shows a mean detection accuracy on the vertical axis for the important classes as a function of the number of components of the other classes on the horizontal axis.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for classifying a video, comprising the steps of:
defining a set of classes for classifying an audio signal of a video;
combining selected classes of the set as a subset of important classes, the subset of important classes is important for a specific highlighting task;
combining the remaining classes of the set as a subset of other classes;
training jointly the subset of important classes and the subset of other classes with training audio data to form a task specific classifier;
classifying the audio signal using the task specific classifier as either important or other to identify highlights in the video corresponding to the specific highlighting task;
representing the subset of important classes with a first Gaussian mixture model; and
representing the subset of other classes with a second Gaussian mixture model, in which a number C of the subsets of classes is 2, and there are $N_{train}$ samples in a vector x of the training audio data, and each sample $x_i$ has an associated class label $y_i$ that takes on values 1 to C, and the task specific classifier has a form:

$$f(x; m) = \underset{y}{\operatorname{argmax}}\, p(x \mid y, m_y, \Theta_y),$$

where $$\underset{y}{\operatorname{argmax}}\, p(x \mid y, m_y, \Theta_y)$$

is a value of y for which $p(x|y, m_y, \Theta_y)$ has a largest value, p stands for a condition probability, where the symbol | indicates a condition of the probability of the sample x given the class label y, $m=[m_1, \ldots, m_c]^T$ is a number of mixture components for each Gaussian mixture model, and $\Theta$ represents parameters of each Gaussian mixture model.

2. The method of claim 1, further comprising:
segmenting the video according to the classified audio signal into important segments and other segments; and
combining the important segments into a summary of the video.

3. The method of claim 1, further comprising:
partitioning the audio signal into frames;
extracting audio features from each frame;
classifying each frame according to the audio features as either an important frame or an other frame.

4. The method of claim 3, in which the audio features are modified discrete cosine transforms.

5. The method of claim 1, in which the video is of a sporting event, and the specific highlighting task is identifying highlights in the video, and the set of classes includes a mixture of excited speech and cheering, applause, cheering, normal speech, and music classes, and the subset of important classes includes the mixture of excited speech and cheering, and the subset of other classes includes applause, cheering, normal speech, and music.

6. The method of claim 1, in which the training jointly uses K-fold cross validation.

7. The method of claim 1, in which the training jointly optimizes an estimate of classification.

8. The method of claim 1, in which the classifying assigns labels, and further comprising:
determining importance levels of the labels according to the specific highlighting task.

9. The method of claim 1, in which the training audio data includes a validation set with $N_{test}$ samples, and associated labels $(x_i, y_i)$, and an empirical test error on the validation set for a particular m is:

$$TestErr(m) = \frac{1}{N_{test}} \sum_{i=1}^{N_{test}} 1 - \delta(y_i - f(x_i; m)),$$

where TestErr(m) is the empirical test error, $\delta$ is a scalar wherein $\delta$ is 1 when $y_i=f(x_i; m)$, and 0 otherwise.

10. The method of claim 1, in which an optimum number of mixture components $\hat{m}$ is selected according to:

$$\hat{m} = \underset{m}{\operatorname{argmin}}\, TestErr(m),$$

where TestErr(m) is an empirical test error, and where $$\underset{m}{\operatorname{argmin}}\, TestErr(m)$$

is a value of m for which TestErr(m) has a smallest value.

11. A system for classifying a video, comprising:
a memory configured to store a set of classes for classifying an audio signal of a video;
means for combining selected classes of the set as a subset of important classes, the subset of important classes is important for a specific highlighting task;
means for combining the remaining classes of the set as a subset of other classes;
means for training jointly the subset of important classes and the subset of other classes with training audio data to form a task specific classifier;
means for classifying the audio signal using the task specific classifier as either important or other to identify highlights in the video corresponding to the specific highlighting task;
means for representing the subset of important classes with a first Gaussian mixture model; and
means for representing the subset of other classes with a second Gaussian mixture model, in which a number C of the subsets of classes is 2, and there are $N_{train}$ samples in a vector x of the train in audio data, and each sample $x_i$ has an associated class label $y_i$ that takes on values 1 to C, and the task specific classifier has a form:

$$f(x; m) = \underset{y}{\operatorname{argmax}}\, p(x \mid y, m_y, \Theta_y),$$

where $$\underset{y}{\operatorname{argmax}}\, p(x \mid y, m_y, \Theta_y)$$

is a value of y for which $p(x|y, m_y, \Theta_y)$ has a largest value, p stands for a condition probability, where the symbol | indicates a condition of the probability of the sample x given the class label y, $m=[m_1, \ldots, m_c]^T$ is a number of mixture components for each Gaussian mixture model, and $\Theta$ represents parameters of each Gaussian mixture model.

* * * * *